US007768921B2

(12) United States Patent
Nakil et al.

(10) Patent No.: US 7,768,921 B2
(45) Date of Patent: Aug. 3, 2010

(54) IDENTIFICATION OF POTENTIAL NETWORK THREATS USING A DISTRIBUTED THRESHOLD RANDOM WALK

(75) Inventors: Harshad Nakil, San Jose, CA (US); Bryan Burns, Palo Alto, CA (US); Ankur Singla, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 726 days.

(21) Appl. No.: 11/589,645

(22) Filed: Oct. 30, 2006

(65) Prior Publication Data

US 2008/0101234 A1    May 1, 2008

(51) Int. Cl.
*G08B 23/00* (2006.01)
(52) U.S. Cl. .................. 370/235; 370/229; 726/22; 726/23
(58) Field of Classification Search ............. 370/229, 370/235; 726/22–24
See application file for complete search history.

(56) References Cited

U.S. PATENT DOCUMENTS

| 6,219,706 B1* | 4/2001 | Fan et al. ............... 709/225 |
| 6,321,338 B1* | 11/2001 | Porras et al. ............. 726/25 |
| 2004/0054925 A1* | 3/2004 | Etheridge et al. ........ 713/201 |
| 2004/0218532 A1* | 11/2004 | Khirman ............... 370/235 |
| 2005/0039104 A1* | 2/2005 | Shah et al. ............. 714/776 |
| 2005/0125195 A1* | 6/2005 | Brendel ............... 702/182 |
| 2006/0075491 A1* | 4/2006 | Lyon ................... 726/22 |
| 2006/0288413 A1* | 12/2006 | Kubota ................. 726/23 |

OTHER PUBLICATIONS

Haining Wang, et al, "Detecting SYN Flooding Attacks", Proc. Infocom, 2002.*
European Search Report dated May 19, 2009 for corresponding European Application No. 07251400, 7 pgs.
Jelena Mirkovic, "D-WARD: Source-End Defense Against Distributed Denial-of-Service Attacks," Chapter 6 "D-WARD," University of California, Los Angeles, 2003, 54 pgs.

* cited by examiner

*Primary Examiner*—William Trost, IV
*Assistant Examiner*—Charles C Jiang
(74) *Attorney, Agent, or Firm*—Shumaker & Sieffert, P.A.

(57) ABSTRACT

In general, the invention is directed to techniques of identifying an infected network device in a computer network where traffic to and from the infected network device is not necessarily routed through a single point on the computer network. For example, individual line cards in network devices count incoming network flows from network devices in host tables. The host tables of all line cards of all participating network devices are then correlated. It is then determined whether the number of flows from a network device outweighs the number of flows to the network device to a significant degree. If so, the network device may be considered suspicious. Packets from a suspicious network device may be rerouted to a network security device for more thorough inspection.

38 Claims, 8 Drawing Sheets

LC HOST TABLE 100A

| HOST | SOURCE COUNTER | DEST. COUTER |
|---|---|---|
| 207.142.131.284 | 45 | 42 |
| 207.142.131.040 | 180 | 120 |
| ••• | | |
| 207.142.085.079 | 15 | 250 |

LC HOST TABLE 100B

| HOST | SOURCE COUNTER | DEST. COUTER |
|---|---|---|
| 56.123.078.254 | 13 | 16 |
| 207.142.131.040 | 50 | 12 |
| ••• | | |
| 207.142.085.079 | 12 | 40 |

⎫
⎬ 102
⎭

LC HOST TABLE 100C

| HOST | SOURCE COUNTER | DEST. COUTER |
|---|---|---|
| 56.123.078.254 | 7 | 12 |
| 207.142.131.040 | 78 | 23 |
| ••• | | |
| 207.142.085.079 | 33 | 56 |

LC HOST TABLE 100D

| HOST | SOURCE COUNTER | DEST. COUTER |
|---|---|---|
| 142.43.121.284 | 12 | 13 |
| 207.142.131.040 | 180 | 120 |
| ••• | | |
| 207.142.085.079 | 3 | 8 |

| DEVICE HOST TABLE 34A | | |
|---|---|---|
| HOST | SOURCE COUNTER | DESTINATION COUNTER |
| 207.142.131.284 | 45 | 42 |
| 207.142.131.040 | 230 | 132 |
| ⋮ | | |
| 207.142.085.079 | 27 | 290 |
| 56.123.078.254 | 13 | 16 |

| DEVICE HOST TABLE 34A | | |
|---|---|---|
| HOST | SOURCE COUNTER | DESTINATION COUNTER |
| 142.43.121.284 | 12 | 13 |
| 207.142.131.040 | 258 | 143 |
| ⋮ | | |
| 207.142.085.079 | 36 | 64 |
| 56.123.078.254 | 7 | 12 |

FIG. 6

| SYSTEM HOST TABLE 34A | | |
|---|---|---|
| HOST | SOURCE COUNTER | DESTINATION COUNTER |
| 207.142.131.284 | 45 | 42 |
| 207.142.131.040 | 488 | 275 |
| ⋮ | | |
| 207.142.085.079 | 63 | 354 |
| 56.123.078.254 | 20 | 28 |
| 142.43.121.284 | 12 | 13 |

IDENTIFICATION OF POTENTIAL NETWORK THREATS USING A DISTRIBUTED THRESHOLD RANDOM WALK

TECHNICAL FIELD

The invention relates to computer networks, and particularly to computer network security.

BACKGROUND

Computer viruses and worms are major threats to corporate and home computer networks. Viruses and worms may cause exposure of sensitive information, congestion of computer networks, hardware and software malfunction, and other problems. Many viruses and worms attempt to replicate themselves on as many network devices as possible. To replicate itself, a virus or worm on an infected network device may cause the network device to attempt to create network connections to other network devices. If the network device successfully creates a network connection to another network device, the virus or worm may use the network connection to transmit a copy of itself to the other network device or to cause the other network device to execute malicious code.

In general, an infected network device is not preprogrammed with network addresses of network devices within the network (e.g., an enterprise network) that are online and able to accept connections with the infected network device. Consequently, the infected network device typically performs a portscan of network addresses to find vulnerable systems by attempting to establish network connections over a series of network addresses. For example, the infected network device may send an invitation to create a network connection (e.g., a Transport Control Protocol SYN message) to each Internet Protocol address in a local subnet (e.g., 68.122.053.xxx). Because the infected network device is sending invitations to network devices that may not exist or may not accept network connections, many of the invitations sent by the infected network device are rejected or simply fail. An infected network device that sends many invitations to create network connections without many of these invitations being accepted is sometimes referred to as a "suspicious network device."

A network security device may use a threshold random walk algorithm to identify suspicious network devices. A network security device using the threshold random walk algorithm maintains a counter for each network device that has sent an invitation through the network security device. The network security device increments the counter for a network device whenever an invitation from the network device is accepted and decrements the counter for the network device whenever an invitation from the network device is rejected. If the counter for a network device falls below a minimum threshold, this indicates that the network device is sending many invitations to other network devices without many of those network devices accepting the invitations. Hence, the network security device may suspect that the network device has been infected by a virus or other threat. The network security device may then quarantine the suspected infected network device.

SUMMARY

In general, the invention is directed to techniques of identifying an infected network device in a computer network where traffic to and from the infected network device is not necessarily routed through a single point on the computer network. For example, in one embodiment, individual line cards in network devices distributed throughout the network count incoming network flows from network devices. The line cards of the distributed network devices may, for example, maintain host tables that store statistics for the network flows identified by each line card. Control units in each of the network devices correlate the host tables of all line cards of all participating network devices. The control units then determine whether the number of flows from a network device outweighs the number of flows to the network device to a significant degree. If so, the control units may consider the network device to be suspicious. The control units may then reroute packets from a suspicious network device to a network security device for more thorough inspection.

For example, a router in an enterprise network may include a set of line cards. Each line card maintains a hash table and a host table. When a line card receives a packet from the enterprise network, the line card determines whether the packet represents a rejection of a network connection (e.g., a TCP RST packet). If the packet does not represent a rejection of a network connection, the line card determines whether the packet is part of a flow in the hash table. If the packet is not part of a flow in the hash table, the line card enters a new flow in the hash table and increments counters in the host table for the source address of the packet and the destination address of the packet. Next, e.g., periodically, a control unit in the router may correlate the host tables in the line cards into a device host table. The control unit may coordinate with control units of other routers in the enterprise network to correlate device host tables of other distributed devices into a system host table. The control unit, operating on behalf of the distributed devices, may then analyze the system host table to identify network devices for which the number of failed connection attempts exceeds a given threshold. If the number of failed connection attempts exceeds the threshold, the control unit may determine that the identified network devices may be attempting to initiate many network connections that either fail or that other devices are rejecting. Because this is a hallmark of an infected network device, the control unit may instruct the line cards to reroute network traffic from the network devices to an intrusion detection and prevention device that may determine whether the network devices are, in fact, infected. In this way, the routers of the enterprise network may cooperate to identify suspicious network devices even though all traffic from a given network device may not necessarily flowing through a common point in the enterprise network, as is often the case in networks that utilize asymmetric routing.

In one embodiment, a method comprises determining whether a difference between a number of network flows sent from a host device on a network via a plurality of network paths and a number of network flows sent to the host device on the network via the plurality of network paths exceeds a first threshold. The method also comprises rerouting network traffic from the host device when it is determined that the difference exceeds the first threshold.

In another embodiment, a network device comprises a threat identification module to determine whether a difference between a number of network flows sent from a host device on a network via a plurality of network paths and a number of network flows sent to the host device on the network via the plurality of network paths exceeds a first threshold. The network device also comprises a traffic redirection module to reroute network traffic from the host device when the threat identification module determines that the difference exceeds the first threshold.

In another embodiment, a computer-readable medium comprises instructions. The instructions cause a programmable processor of a network device to determine whether a difference between a number of network flows sent from a host device on a network via a plurality of network paths and a number of network flows sent to the host device on the network via the plurality of network paths exceeds a first threshold. The instructions also cause the processor to reroute network traffic from the host device when it is determined that the difference exceeds the first threshold.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
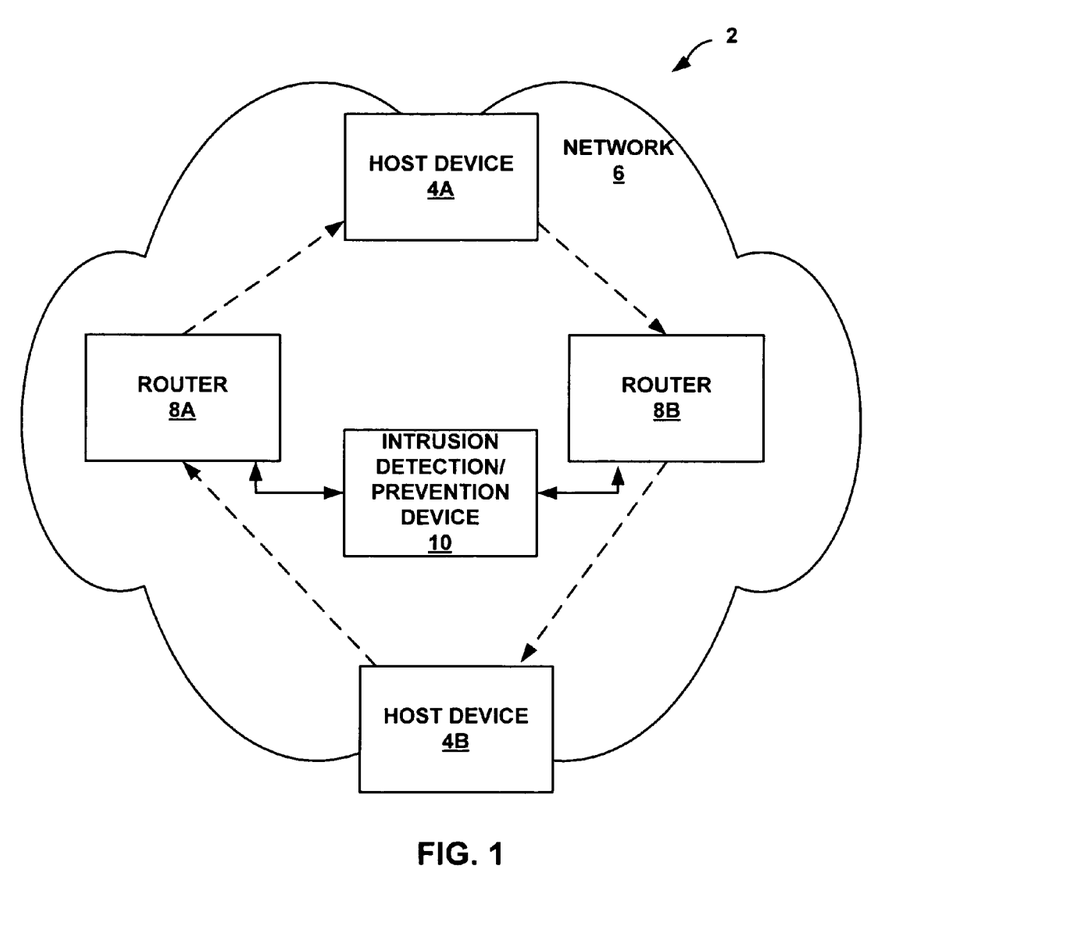
FIG. 1 is a block diagram illustrating an exemplary asymmetrically routed network in which routers cooperate to implement a distributed random walk technique to identify any suspicious host devices.

FIG. 1 is a block diagram illustrating an exemplary system 2 that includes an asymmetrically routed network 6 in which routers 8A and 8B cooperate to implement a distributed random walk technique to identify any suspicious host devices. For purposes of example, system 2 is shown as including routers 8A and 8B that cooperate to implement a distributed random walk technique to identify any host devices that are suspicious. For ease of illustration, only two host devices 4A and 4B (collectively, host devices 4) are shown, and the host devices may be personal computers, servers, network data centers, intermediate network devices, television set-top boxes, network telephones, network appliances, mobile devices, and so on.

Network 6 may be an enterprise network. For example, a corporation may maintain network 6 to facilitate communication for employees' computers and for communication with clients and customers. Host devices 4 may be coupled directly or indirectly to network 6. For example, host device 4A may be indirectly coupled to network 6 via an internet service provider and the Internet or via a private network link. Meanwhile, host device 4B may be directly coupled to network 6, as could be the case if host device 4B is a network device coupled to a local area network (LAN) of an enterprise.

System 2 illustrates a simplified example of an asymmetrically routed network. That is, traffic flowing in one direction from host device 4A to host device 4B flows through a different path than traffic flowing in the opposite direction. As described herein, routers 8A cooperate to detect any of host devices 4 that may become infected with computer viruses or worms. For example, such malicious computer programs may cause host devices 4 to attempt to create network connections through network 6 to other ones of host devices 4. The malicious programs may then attempt to use these network connections for illegitimate purposes. For example, a malicious program executing on host device 4A could use a network connection to host device 4B to make host device 4B execute a copy of the malicious program. In another example, the malicious program executing on host device 4A could use a network connection to host device 4B to cause host device 4B to send sensitive information, such as credit card numbers, to host device 4A.

In most cases, malicious programs are not preprogrammed with knowledge of the network addresses of host devices 4 and with knowledge of which ones of host devices 4 accept network connections. Therefore, malicious programs may cause the infected host device to attempt to create many network connections in an attempt to identify network addresses of host devices 4 and to identify which ones of host devices 4 accept network connections. Many of these attempts will fail either because no host device exists with a given network address or because host devices 4 refuse to create network connections with the infected host device. Thus, a hallmark indication of viral infection is a host device that attempts to create a significantly greater number of network connections than are accepted. Furthermore, if one or more of host devices 4 makes many unsuccessful attempts to create network connections with a particular host device, this may be an indication that the particular host device is "under attack." That is, a malicious program executing on one or more of host devices 4 may be targeting a particular device for some illegitimate purpose.

In order to create network connections to other host devices, host devices 4 send connection requests through network 6. Each connection request typically includes a source address field, a destination address field, a protocol field, a source port field, and a destination port field. For example, if the connection request is from host device 4A to host device 4B, the source address field contains the network address of host device 4A, the destination address field contains the network address of host device 4B. A set of packets sharing the same values for the source address field, the destination address field, the protocol field, the source port field, and the destination port field may be referred to as a "network flow."

Each of routers 8 may include sets of line cards to send and receive packets, including connection requests and connection acknowledgements. The line cards may be interconnected by a high-speed switch. The line cards of the routers 8 may, for example, maintain host tables that store statistics for the network flows identified by each line card. For example, when a line card in one of routers 8 receives a packet from one of host devices 4 or another one of routers 8, the line card determines whether the packet represents a rejection of a connection (e.g., a TCP RST packet). If the packet represents a rejection of a connection, the line card forwards the packet. Otherwise, if the packet does not represent a rejection of a connection, the line card extracts information that identifies a flow for the packet. In other words, the line card extracts the source address field, the destination address field, the protocol field, the source port field, and the destination port field of the packet. The line card may then access a hash table to determine whether the line card has previously received another packet in the same flow. That is, the line card may perform a hash function on the source address field, the destination address field, the protocol field, the source port field, and the destination port field of a packet. If the hash table does not contain an entry for the resulting hash value, the line card regards the packet as being part of a new flow and creates an entry in the hash table for the hash value. If the line card has previously received another packet in the same flow as the packet, the line card updates a timestamp in the hash table and forwards the packet without updating its LC host table.

If the line card has not previously received another packet in the same flow as the packet, the line card modifies the LC host table to record the detected flow. Importantly, the flow need not represent an established connection. Rather, the line card even records connection attempts (e.g., SYN packets) and connection acknowledgements (e.g., SYN-ACKS) between host devices. In one embodiment, the host table within each line card contains an entry for each network address that has been used in a packet as a source address or as a destination address. Each entry in the host table contains a host source counter and a destination source counter. For each new flow, the line card updates its host table by incrementing the source counter for the network address of the source device and incrementing the destination counter for network address of the destination device. In this way, the line card maintains a record of the number of flows each host device sources and a record of the number of flows for which each host device operates as a destination.

Periodically, each of the control units of routers 8 correlate the LC host tables of their respective line cards into a respective "device host table." For example, the control unit merges the LC host tables from its line cards and into a device host table by creating an entry in the device host table for each unique entry in the line card host tables. That is, the control unit creates an entry in the device host table for each network address that has been specified as either a source address or a destination address in a packet flow received by any of the line cards. For each of the entries in the device host table, the control unit sums the source counters of each equivalent entry of the line card host tables and sums the destination counters of each equivalent entry in the line card host tables. In this way, the control unit maintains a record of the number of flows through the router for which a host device is a source and a record of the number of flows through the router for which a host device is a destination.

After correlating the host tables of the line cards into device host tables, the control units of routers 8 may correlate the device host tables of each of routers 8 into system host tables. For example, a control unit of one of routers 8 may send a request for device host table information to each of the other routers in a peer-to-peer fashion using a network management protocol such as Link Level Discovery Protocol (LLDP). In response, the other routers communicate their respective device host tables to the requesting router. The receiving router then correlates the distributed host tables into a single system host table for asymmetrically routed network 6.

To correlate the device host tables, the control unit of the receiving router creates an entry in the system host table for each unique entry in the device host tables. For each of the entries in the system host table, the control unit sums the source counters of each equivalent entry of the device host tables and sums the destination counters of each equivalent entry of the device host tables. In this way, the control unit maintains a record of the number of flows through network 6 for which a host device is a source and a record of the number of flows through network 6 for which a host device is a destination.

Control units of routers 8 may use system host tables to identify any suspicious network devices, which may provide an indication that the device has been infected by a virus or other threat. For example, a control unit of one of routers 8 may analyze a system host table to compare the relative number of flows through network 6 for which a host device is a source to the number of flows for which the host device is a destination. For example, the control unit may subtract the destination counter in the system host table for a host device from the source counter for that host device. If the difference exceeds a given threshold, the control unit may consider the host device to be suspicious.

In the situation where a host device is sourcing significantly more flows than the host device is receiving, in view of the realization that host devices generally communicate using bidirectional flows, the control unit may determine that the host device is may be attempting to create network connections with other host devices that either do not exist or that are rejected the connection attempts. In this manner the control unit may use the system host table to identify indicators that one of host devices 4 within asymmetrically routed network 6 is infected with a computer virus or worm even though neither router 8A or 8B necessarily views all of the traffic to and from that host device. Furthermore, if the relative number of flows through network 6 for which a host device is a destination compared with the number of flows for which the host device is a source exceeds a second threshold, the control unit may consider the host device to be under attack.

When a control unit of one of routers 8 considers one of host devices 4 to be suspicious, the control unit may cause packets from the host device to be rerouted to an Intrusion Detection and Prevention ("IDP") device 10. In addition, when a control unit of one of routers 8 considers one of host devices 4 to be under attack, the control unit may cause packets addressed to the host device to be rerouted to IDP device 10. For example, a control unit of router 8A may send instructions to each line card in router 8A to update forwarding tables in the line cards such that the line cards forward packets from the suspected host device to IDP device 10. IDP device 10 may then inspect packets from the suspected host device to determine whether the packets contain other indications that malicious software has actually infected the suspected host device. For instance, IDP device 10 may deeply inspect the contents of the packets for signatures of malicious software. If IDP device 10 confirms that malicious software has infected the suspected host device, IDP device 10 may cause the suspected host device to be quarantined. For example, IDP device 10 may send instructions to routers 8 to drop packets from the suspected host device. In addition, IDP device 10 may send an alert regarding the possible infection to a user of the suspected host device.

The present invention may provide one or more advantages. For example, the present invention may be able to identify potentially infected host devices when flows to and from the host devices, including network connection requests and acknowledgements, may follow different paths through a network. For this reason, it is not necessary for all network traffic to flow through a common point on the network in order to identify potentially infected host devices. Because not all network traffic must flow through a common point on the network, the present invention may remove a significant bottleneck. Furthermore, because the present invention does not require the deep inspection of packets in a network security device (e.g., IDP device 10) to initially detect potentially infected host devices, a line card may implement embodiments of the present invention while forwarding packets at line speed.

Figure 2:
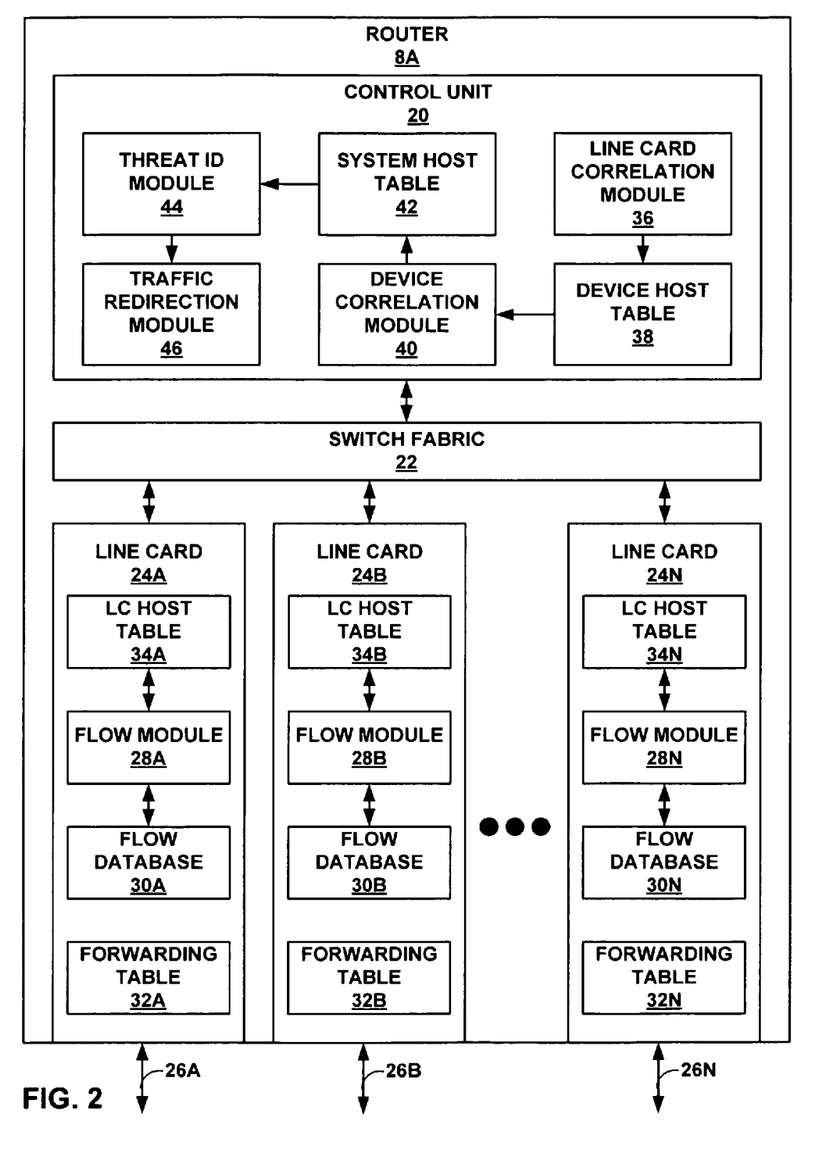
FIG. 2 is a block diagram illustrating an exemplary router that uses a distributed random walk technique to identify potentially infected host devices within an asymmetrically routed network.

FIG. 2 is a block diagram illustrating an exemplary router 8A that uses a distributed random walk technique to identify potentially infected ones of host devices 4 within an asymmetrically routed network. As illustrated in the example of FIG. 2, router 8A comprises a control unit 20, a switch fabric 22, and a set of line cards 24A through 24N (collectively, line cards 24). Line cards 24A through 24N may send packets to or receive packets from network paths 26A through 26N, respectively. Network paths 26A through 26N may be referred to herein as network paths 26.

Each of line cards 24A through 24N include flow modules 28A through 28N, hash tables 30A through 30N, forwarding tables 32A through 32N, and LC host tables 34A through 34N, respectively. Flow modules 28A through 28N may be collectively referred to herein as flow modules 28, hash tables 30A through 30N may be collectively referred to herein as hash tables 30, forwarding tables 32A through 32N may be collectively referred to as forwarding tables 32, and LC host tables 34A through 34N may be collectively referred to herein as LC host tables 34.

When one of line cards 24 receives a packet from a respective one of network paths 26, a respective one of flow modules 28 extracts flow information from the packet. For example, if line card 24A receives a SYN packet or a SYN-ACK packet from network path 26A, flow module 28A extracts flow information from the packet. In particular, flow module 28A may extract a source address field, a destination address field, a protocol field, a source port field, and a destination port field from the network packet. After extracting flow information from the packet, flow module 28A may perform a hash function on the flow information to obtain a hash value. Flow module 28A may then determine whether hash table 30A contains an entry for the hash value. Each entry in hash table 30A may be a timestamp that indicates the last time flow module 28A used the entry. Given an appropriate hash function and hash table data structure, flow module 28 may be able to perform the hash function and the hash table look up at line speed. In some embodiments, hash table 30A may be replaced by a flow database that stores flow information or otherwise.

If hash table 30A contains an entry for the hashed flow information, flow module 28A does not consider the received packet to be a part of a new flow. Because flow module 28A does not consider the received packet to be a part of a new flow, flow module 28A may update the timestamp of the entry in hash table 30A for the extracted flow information. Flow module 28A may then forward the packet on network 6 via one of network paths 26 according to forwarding information stored in forwarding table 32A. However, if hash table 30A does not contain an entry for the hashed flow information, flow module 28A adds a new entry to hash table 30A for the hashed flow information.

Flow module 28A may periodically purge entries from hash table 30A when the timestamp indicates use the timestamp of a record in hash table 30A to purge old entries from hash table 30A. For example, if a timestamp of a record in hash table 30A indicates a time more than five minutes ago, flow module 28A may delete the record in hash table 30A. When flow module 28A receives a packet, flow module 28A sets a timestamp of a record in hash table 30A for the flow of the packet to the current time. In this way, hash table 30A is more likely to contain only active network flows.

In addition to adding a new entry to hash table 30A when hash table 30A does not contain an entry for the hashed flow information, flow module 28A also modifies LC host table 34A to record the new flow. LC host table 34A contains entries for each host device specified as a source device or as a destination device in network flows that have recently passed through line card 24A. Each entry in LC host table 34A includes a source counter and a destination counter. The source counter of an entry for a host device in LC host table 34A specifies the number of flows that have recently passed through line card 24A that have specified the host device as a source device. The destination counter of an entry for a host device in LC host table 34A specifies the number of flows that have recently passed through line card 24A that have specified the host device as a destination device.

To modify LC host table 34A, flow module 28A may first determine whether LC host table 34A contains an entry for the source device specified in the packet. If LC host table 34A does not contain an entry for the source device specified in the packet, flow module 28A adds an entry in LC host table 34A for the source device specified in the packet. Flow module 28A then sets a source counter in the entry for the source device specified in the packet to one. On the other hand, if LC host table 34A contains an entry for the source device specified in the packet, flow module 28A increments the source counter in the entry by one.

After determining whether LC host table 34A contains an entry for the source device specified in the packet, flow module 28A determines whether LC host table 34A contains an entry for the destination device specified in the packet. If LC host table 34A does not contain an entry for the destination device specified in the packet, flow module 28A adds an entry in LC host table 34A for the destination device specified in the packet. Flow module 28A then sets a destination counter in the entry for the destination address specified in the packet to one. On the other hand, if LC host table 34A contains an entry for the destination device specified in the packet, flow module 28A increments the destination counter in the entry by one.

Each entry in LC host table 34A may also contain a host bitmap field and a port bitmap field. In some embodiments, flow module 28A may use the host bitmap field to compress the source and destination counters into a single fixed width field. This compression may be useful when LC host tables 34A are correlated as explained below.

A line card correlation module 36 in control unit 20 may periodically correlate LC host tables 34 into a device host table 38. For example, line card correlation module 36 may periodically request that each of line cards 24 send copies of LC host tables 34 to line card correlation module 36. After receiving the copies of LC host tables 34, line card correlation module 36 creates an entry in device host table 38 for each unique entry in LC host tables 34. Thus, device host table 38 contains entries for each host device specified as a source device or as a destination device in network flows that have recently passed through router 8A. Like LC host tables 34, each entry in device host table 38 includes a source counter and a destination counter. The source counter of an entry for a host device in device host table 38 specifies the number of flows that have recently passed through router 8A that have specified the host device as a source device. In other words, the source counter for an entry for a host device in device host table 38 is the sum of the source counters for the host device in each of LC host tables 34. The destination counter of an entry for a host device in device host table 38 specifies the number of flows that have recently passed through router 8A that have specified the host device as a destination device. In other words, the destination counter for an entry for a host device in device host table 36 is the sum of the destination counters for the host device in each of LC host tables 34.

A device correlation module 40 in control unit 20 may periodically correlate device host table 38 with other device host tables in other ones of routers 8 into a system host table 42. For example, device correlation module 40 may periodically request that each of routers 8 send copies of their device host tables to device correlation module 40. After receiving copies of the device host tables, device correlation module 40 creates an entry in system host table 42 for each unique entry in the device host tables. Thus, system host table 42 contains entries for each host device specified as a source device or as a destination device in network flows that have recently passed through routers 8. Like device host table 38, each entry in system host table 42 includes a source counter and a destination counter. The source counter of an entry for a host device in system host table 42 specifies the number of flows that have recently passed through routers 8 that have specified the host device as a source device. In other words, the source counter for an entry for a host device in system host table 42 is the sum of the source counters for the host device in each of the device host tables. The destination counter of an entry for a host device in system host table 42 specifies the number of flows that have recently passed through routers 8 that have specified the host device as a destination device. In other words, the destination counter for an entry for a host device in system host table 42 is the sum of the destination counters for the host device in each of the device host tables.

A threat identification module 44 in control unit 20 analyzes system host table 42 to identify ones of host devices 4 that are suspicious or potentially under attack. For example, for each entry in system host table 42, threat identification module 44 may calculate a difference by subtracting the destination counter for the host from the source counter. If the difference is above a first threshold (e.g., plus fifty), threat identification module 44 may consider the host device associated with the entry to be suspicious because the host device is sourcing more flows (including connection requests, e.g., SYN packets) than the host device is receiving (including connection acknowledgements, e.g., SYN-ACK packets). On the other hand, if the difference is below a second threshold (e.g., negative fifty), threat identification module 44 may consider the host device to be potentially under attack because the host device is receiving significantly more flows (including connection requests, e.g., SYN packets) than the host device is sending (including connection requests, e.g., SYN packets).

When threat identification module 44 determines that one of host devices 4 is suspicious or potentially under attack, threat identification module 44 sends an alert to a traffic redirection module 46 in control unit 20. Traffic redirection module 46 is responsible for rerouting network traffic from the suspected one host devices 4 to IDP device 10 when threat identification module 44 determines that the difference between the number of network flows sent from a host device on network 6 via network paths 26 and a number of network flows sent to the host device on network 6 via network paths 26 exceeds the first threshold. For example, traffic redirection module 46 may send instructions to line cards 24 to modify forwarding tables 32 in response to the alert from threat identification module 44. If threat identification module 44 determines that one of host devices 4 is suspicious, traffic redirection module 46 may send instructions to line cards 24 to modify forwarding tables 32 such that line cards 24 forward packets from the suspected host device to IDP device 10. If threat identification module 44 determines that one of host devices 4 is potentially under attack, traffic redirection module 46 may send instructions to line cards 24 to modify forwarding tables 32 such that line cards 24 forward packets to the potentially attacked host device to IDP device 10. In this way, IDP device 10 may inspect the packets more thoroughly.

Figure 3:
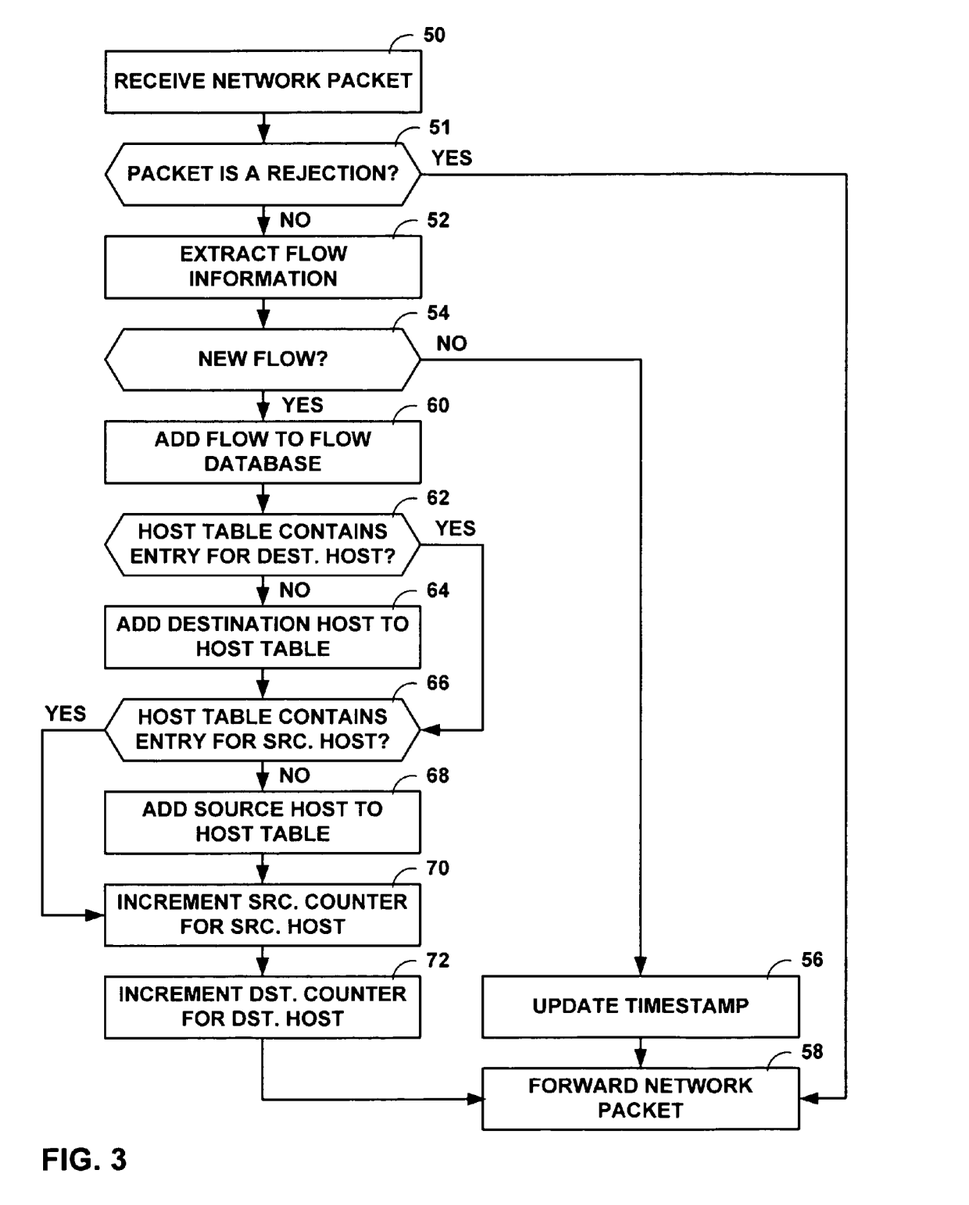
FIG. 3 is a flowchart illustrating an exemplary operation of a flow module in a line card of a router that uses a distributed random walk technique to identify potentially infected host devices within an asymmetrically routed network.

FIG. 3 is a flowchart illustrating an exemplary operation of a flow module (e.g., flow module 28A) in line card 24A of router 8A that uses a distributed random walk technique to identify potentially infected host devices within an asymmetrically routed network. Initially, flow module 28A receives a packet from network path 26A (50). After receiving the packet, flow module 28A determines whether the packet represents a rejection of a network connection (51). If the packet represents a rejection of a network connection ("YES" of 51), flow module 28A forwards the packet (58). On the other hand, if the packet does not represent a rejection of a network connection ("NO" of 51), flow module 28A extracts flow information from the packet (52).

Flow module 28A uses the extracted flow information to determine whether the packet belongs to a new flow (54). For example, flow module 28A may perform a hash function on the extracted flow information to derive a hash value. Flow module 28A may then determine that the flow is a new flow if hash table 30A does not contain an entry for that hash value or does not contain an entry with a recent timestamp. If the packet does not belong to a new flow ("NO" of 54), flow module 28A may update a timestamp in the entry of hash table 30A with flow information that matches the extracted flow information (56). Flow module 28A may then forward the packet (58). On the other hand, if the packet does belong to a new flow ("YES" of 54), flow module 28A may add an entry for the new flow to hash table 30A (60). For instance, flow module 28A may create an entry containing a timestamp in hash table 30A at a hash value of the extracted flow information.

After flow module 28A adds an entry for the new flow to hash table 30A, flow module 28A determines whether LC host table 34A contains an entry for a destination host specified in the packet (62). If LC host table 34A does not contain an entry for the destination host specified in the packet ("NO" of 62), flow module 28A adds an entry to LC host table 34A for the destination host specified in the packet (64).

After adding the entry to LC host table 34A for the destination host specified in the packet or if LC host table 34A already contains an entry for the destination host specified in the packet ("YES" of 62), flow module 28A determines whether LC host table 34A contains an entry for the source host specified in the packet (66). If LC host table 34A does not contain an entry for the source host specified in the packet ("NO" of 62), flow module 28A adds an entry to LC host table 34A for the source host specified in the packet (68).

After adding the entry to LC host table 34A for the source host device specified in the packet or if LC host table 34A already contains an entry for the source host device specified in the packet ("YES" of 66), flow module 28A increments a source counter in the entry of LC host table 34A for the source host device specified in the packet (70). Flow module 28A then increments a destination counter in the entry of LC host table 34A for the destination host device specified in the packet (72). Once flow module 28A has incremented the destination counter, flow module 28A may update the timestamp for the flow of the packet in hash table 30A (56) and forward the packet (58).

Figure 4:
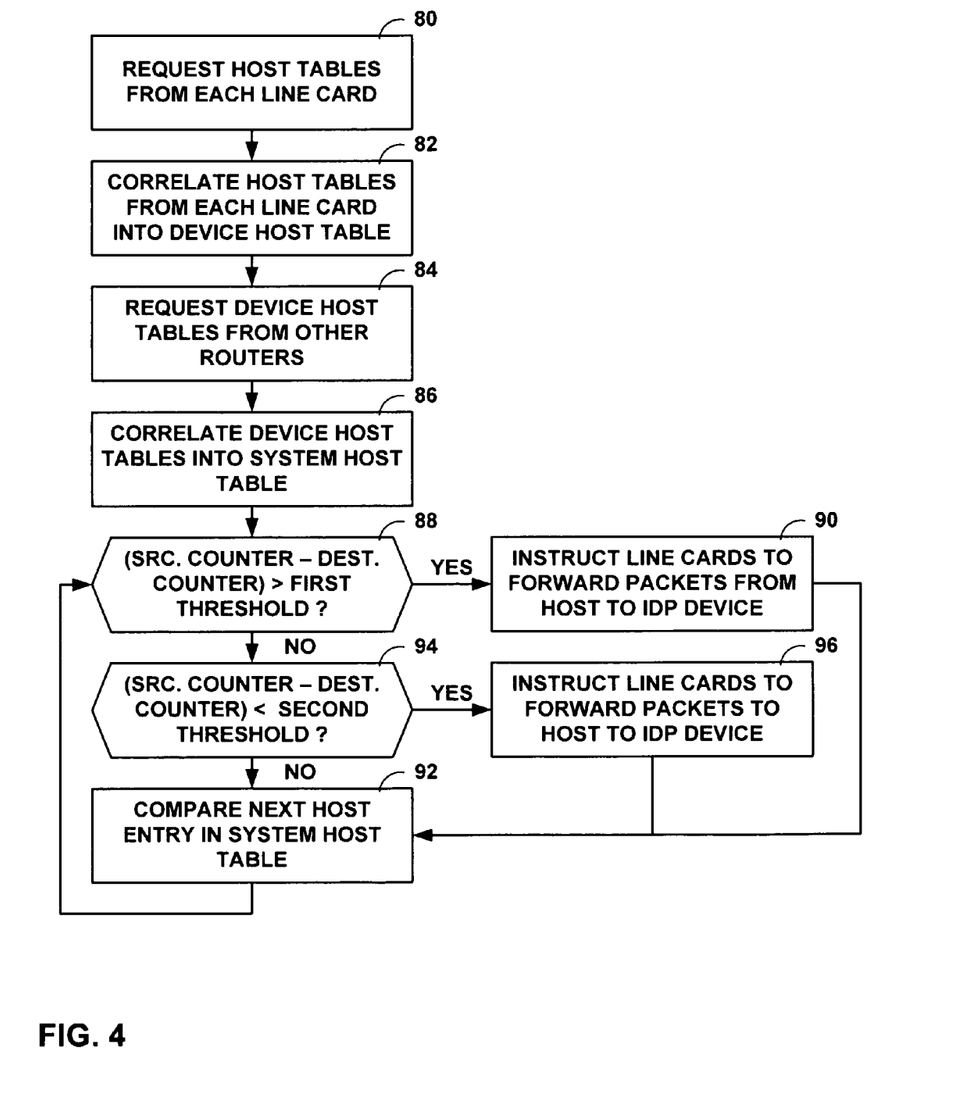
FIG. 4 is a flowchart illustrating an exemplary operation of a control unit of a router that uses a distributed random walk technique to identify potentially infected host devices that are suspicious.

FIG. 4 is a flowchart illustrating an exemplary operation of a control unit (e.g., control unit 20) of router 8A that uses a distributed random walk technique to identify potentially infected host devices that are suspicious. Initially, line card correlation module 36 in control unit 20 requests copies of LC host tables 34 in line cards 24 (80). After requesting the copies of LC host tables 34, line card correlation module 36 correlates LC host tables 34 into device host table 38 (82). As described above, to correlate LC host tables 34 into device host table 38, line card correlation module 36 may create a host entry in device host table 38 for each unique host entry in LC host tables 34. Line card correlation module 36 may then sum the source counters for each host entry in LC host tables 34 and sum the destination counters for each host entry in LC host tables 34 to derive source counters and destination counters for the host entries in device host table 38.

After correlating LC host tables 34 into device host table 38, device correlation module 40 in control unit 20 may request copies of device host tables from each other one of routers 8 (84). After requesting the copies of device host tables from each other one of routers 8, device correlation module 40 may correlate the device host tables into system host table 42 (86). As described above, device correlation module 40 correlates device host tables by creating a host entry in system host table 42 for each unique host entry in the device host tables. Device correlation module 40 then sums the source counters for each host entry in the device host tables and sums the destination counters for each host entry in the device host tables in system host table 42.

Once device correlation module 40 has correlated the device host tables into system host table 42, threat identification module 44 determines whether a source counter in a first host entry of system host table 42 minus a destination counter of the first host entry of system host table 42 is greater than a first threshold (88). If the result of the source counter minus the destination counter is greater than the first threshold ("YES" of 88), traffic redirection module 46 instructs line cards 24 to update forwarding tables 32 such that line cards 24 forward packets from the host device specified by the first host entry to IDP device 10 (90). After traffic redirection module 46 sends the instructions to line cards 24, threat identification module 44 compares source counters and destination counters of a second host entry in system host table 42, and so on (92).

On the other hand, if the result of the source counter minus the destination counter for the first host entry in system host table 42 is not greater than the first threshold ("NO" of 88), threat identification module 44 determines whether the source counter minus the destination counter for the first host entry is less than a second threshold (94). If threat identification module 44 determines that the source counter minus the destination counter for the first host entry is less than the second threshold ("YES" of 94), traffic redirection module 46 instructs line cards 24 to update forwarding tables 32 such that line cards 24 forward packets addressed to the host device specified by the first host entry to IDP device 10 (96). After instructing line cards 24 or if the source counter minus the destination counter is not less than the second threshold ("NO" of 94), threat identification module 44 compares source counters and destination counters for a second host entry in system host table 42, and so on (92).

Figure 5:
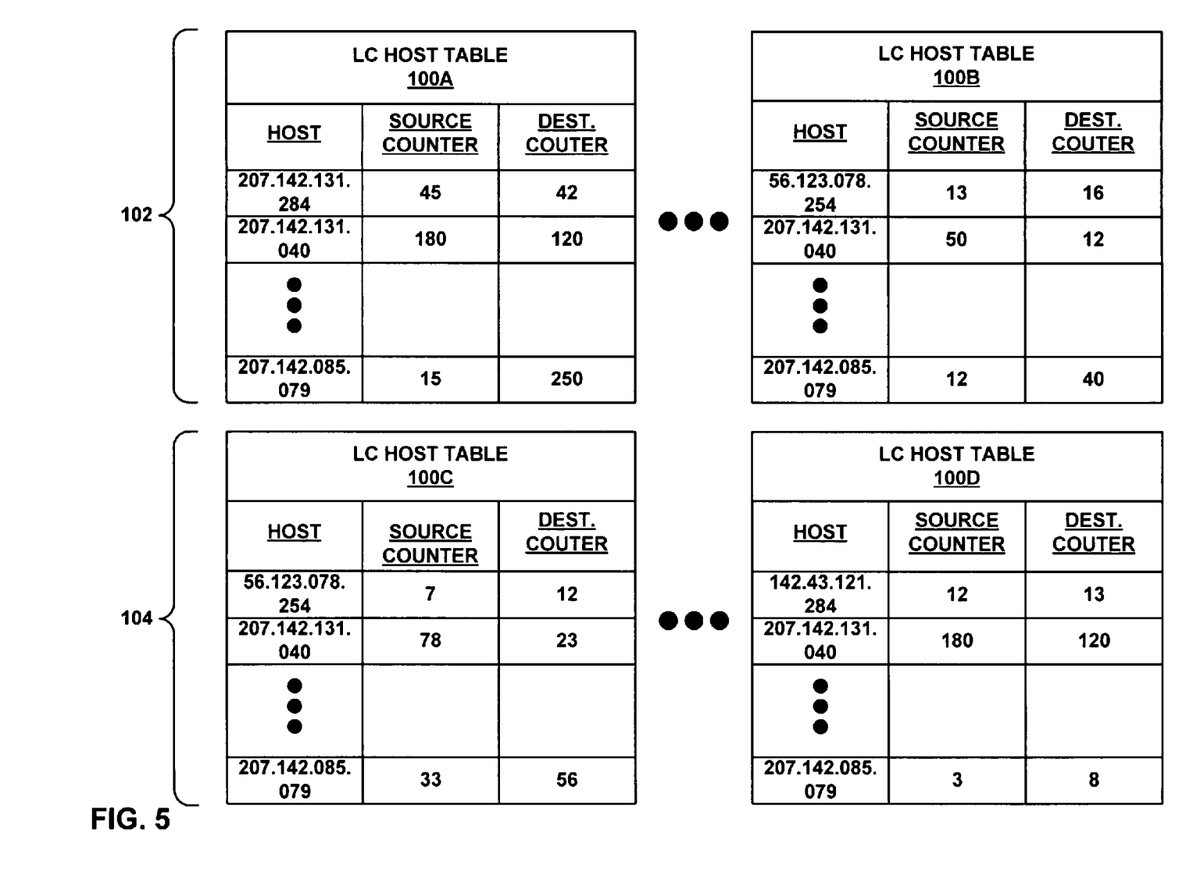
FIG. 5 is a tabular diagram illustrating an exemplary configuration of line card host tables.

FIG. 5 is a tabular diagram illustrating an exemplary configuration of LC host tables. The example of FIG. 5 shows four LC host tables: LC host table 100A, LC host table 100B, LC host table 100C, and LC host table 100D. Collectively, these LC host tables may be referred to herein as LC host tables 100. LC host table 100A and LC host table 100B may represent the LC host tables on a first one of routers 4 while LC host table 100C and LC host table 100D may represent the LC host tables on a second one of routers 4. Each of LC host tables 100 includes a host column, a source counter column, a destination counter column and one or more rows. Each of the rows represents an entry in a LC host table.

Each of the rows in LC host tables 100 are records of a number of network flows through a line card sourced by a host device and a number of network flows through the line card sent to the host device. For example, the host field of a row may contain a network address of a host device. The source counter field of a row may contain a count of network flows through a line card sourced by a host device specified by the network address of the host field of the row. The destination counter field of a row may contain a count of network flows through the line card sent to the host device specified by the network address of the host field of the row. For example, a host field of a first row of LC host table 100A specifies the network address 207.142.131.284. The source counter field of the first row of LC host table 100A specifies "45" as the number of flows through the line card that have specified the network address 207.142.131.284 as a source. The destination counter field of the first row of LC host table 100A specifies "42" as the number of flows through the line card that have specified the network address 207.142.131.284 as a destination.

Figure 6:
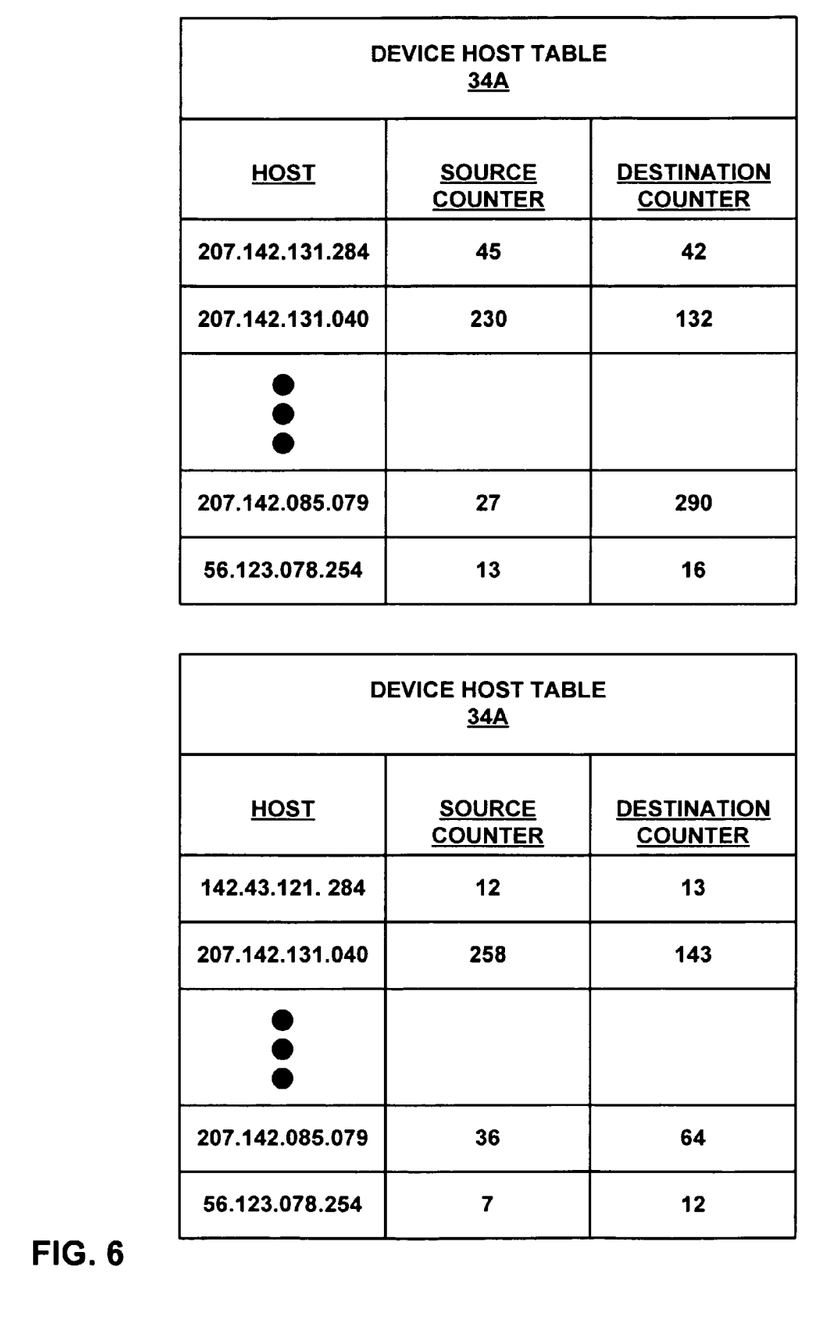
FIG. 6 is a tabular diagram illustrating an exemplary configuration of device host tables.

FIG. 6 is a tabular diagram illustrating an exemplary configuration of device host tables. The example of FIG. 6 shows two device host tables: device host table 110A and device host table 110B. Collectively, device host tables 110A and 110B may be referred to herein as device host tables 110. Each of device host tables 110 includes a host column, a source counter column, a destination counter column, and one or more rows.

Each of device host tables 110 contains a row for each unique host value in their respective set of LC host tables 100. For example, device host table 110A may contain a row for each row in LC host tables 100A and 100B; device host table 110B may contain a row for each row in LC host tables 100C and 100D. For example, LC host table 100A contains rows having host values 207.142.131.284, 207.142.131.040, and 207.142.085.079. LC host table 100A contains rows having host values 56.123.078.254, 207.142.131.040, and 207.142.085.079. Because device host table 110A contains a row for each row in device host tables 100A and 100B having a unique host value, device host table 100A contains rows having host values 207.142.131.284, 207.142.131.040, 207.142.085.079, and 56.123.078.254.

The source counter values of each row in device host tables 110 are sums of the source counter values of rows in their respective sets of LC host tables 100 with the same host values. For example, the source counter values of the row having host value 207.142.131.040 in device host table 110A (i.e., 230) is the sum of the source counter value of the row having host value 207.142.131.040 in LC host table 100A (i.e., 180) and the source counter value of the row having host value 207.142.131.040 in LC host table 100B (i.e., 50).

Similarly, the destination counter values of each row in device host tables 110 are sums of the destination counter values of rows in their respective sets of LC host tables 100 with some host values. For example, the destination counter values of the row having host value 207.142.131.040 is device host tables 110A (i.e., 132) is the sum of the destination counter value of the row having host value 207.142.131.040 in LC host table 100A (i.e., 120) and the source counter value of the row having host value 207.142.131.040 in LC host table 100B (i.e., 12).

Figure 7:
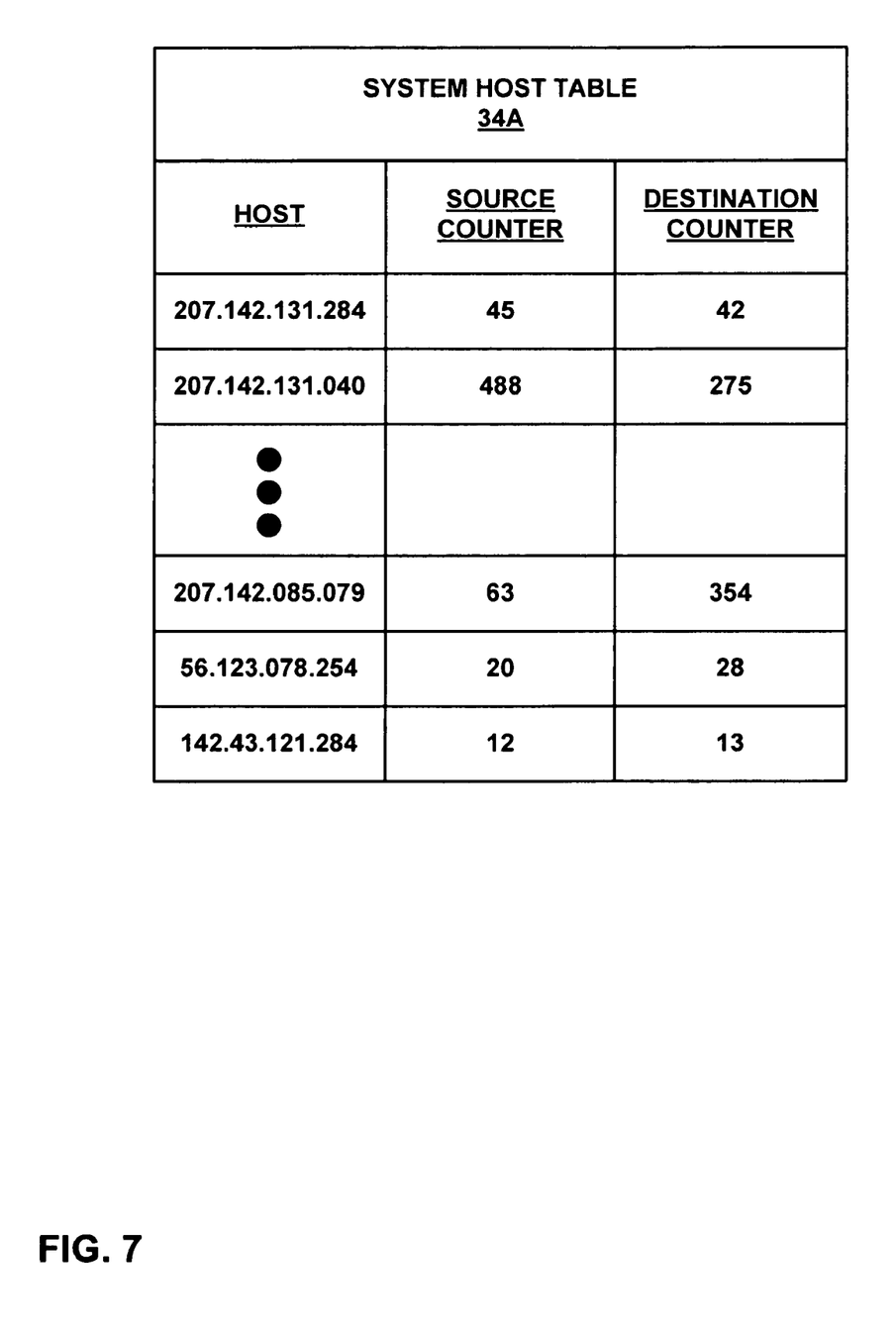
FIG. 7 is a tabular diagram illustrating an exemplary configuration of a system host table.

FIG. 7 is a tabular diagram illustrating an exemplary configuration of a system host table 120. Like LC host tables 100 and device host tables 110, system host table 120 also includes a host column, a source counter column, a destination counter column, and one or more rows.

System host table 120 contains a row for each row in device host tables 110 having a unique host value. For example, device host table 110A includes rows having host values 207.142.131.284, 207.142.131.040, 207.142.085.079, and 56.123.078.254. Device host table 110B includes rows having host values 142.43.121.284, 207.142.131.040, 207.142.085.079, and 56.123.078.254. Because system host table 120 contains a row for each row in device host tables 110 having a unique host value, system host table 120 contains rows having host values 207.142.131.284, 207.142.131.040, 207.142.085.079, 56.123.078.254, and 142.43.121.284.

The source counter values of each row in system host table 120 are sums of the source counter values of rows in device host tables 110 having the same host values. For example, the source counter value of the row having host value 207.142.131.040 in system host table 120 (i.e., 488) is the sum of the source counter value of the row having host value 207.142.131.040 in device host table 110A (i.e., 230) and the source counter value of the row having host value 207.142.131.040 in device host table 110B (i.e., 258).

Similarly, the destination counter values of each row in system host table 120 are sums of the destination counter values of rows in device host tables 110 having the same host values. For example, the destination counter value of the row having host value 207.142.131.040 in system host table 120 (i.e., 275) is the sum of the destination counter value of the row having host value 207.142.131.040 in device host table 100A (i.e., 132) and the destination value of the row having host value 207.142.131.040 in device host table 110B (i.e., 143).

Figure 8:
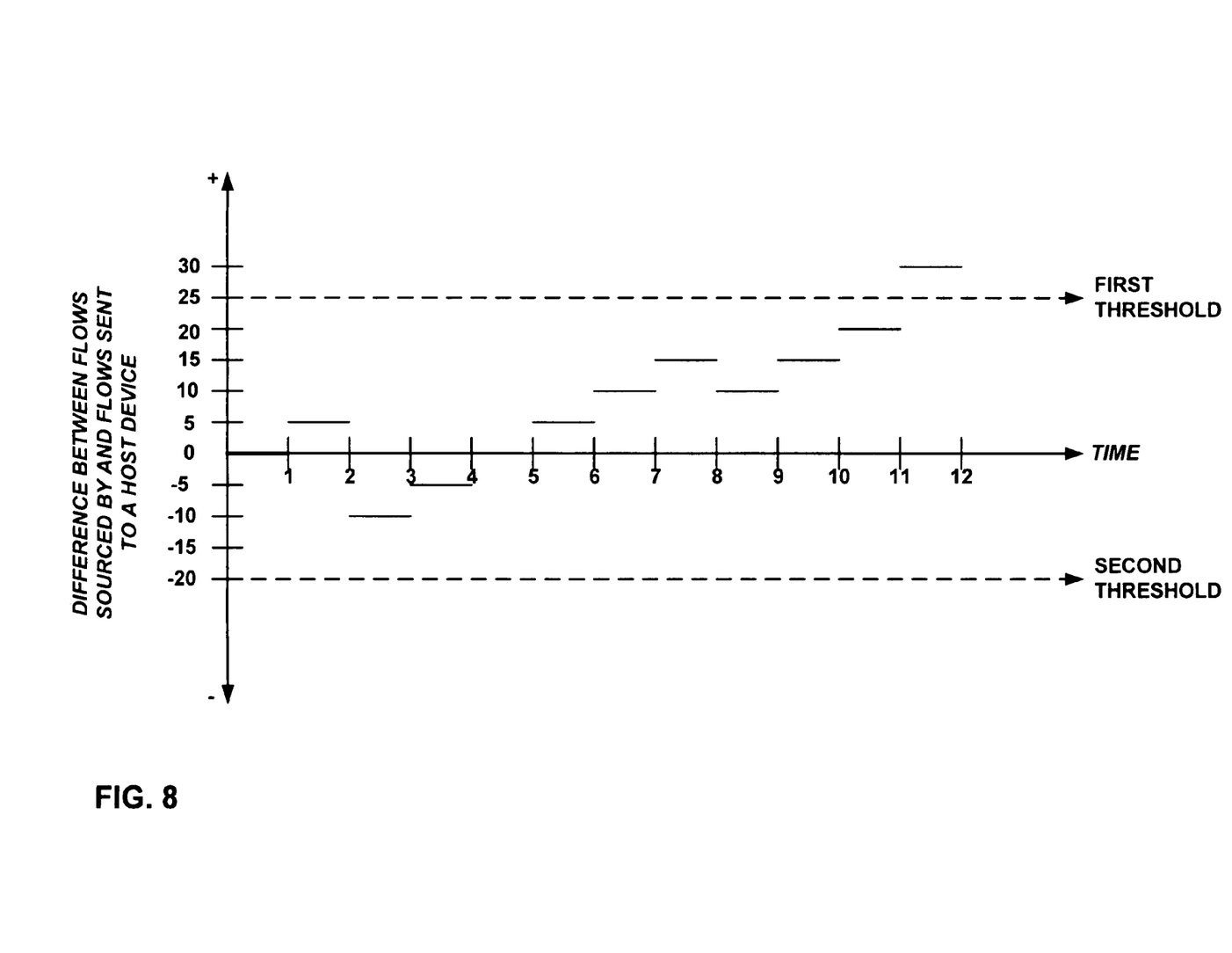
FIG. 8 is a graph representing an exemplary difference between a number of flows sourced by a host device and a number of flows sent to the host device over time.

FIG. 8 is a graph representing an exemplary difference between a number of flows sourced by a host device and a number of flows sent to the host device over time. As illustrated in the example of FIG. 8, the vertical axis represents a difference between a number of network flows sourced by a host device and a number of flows sent to the same host device. For example, threat identification module 44 may calculate the difference by subtracting a number of flows sent to a host device from a number of flows sourced by the host device. The horizontal axis represents time.

Short horizontal lines in FIG. 8 represent the difference at a given time. For example, from time 1 to time 2, the difference is +5. In other words, the host device has sourced five more flows than the host device has been sent. From time 2 to time 3, the difference is −10. In other words, the host device has sourced negative ten more flows than the host device has been sent. This means the host device has been sent ten more flows than the host device has sourced.

The exemplary graph of FIG. 8 also shows a first and a second threshold. The first threshold may represent a difference at which threat identification module 44 considers the host device to be suspicious. The second threshold may represent a difference at which threat identification module 44 considers the host device to be under attack. For example, from time 11 to time 12, the difference is +30. Because the difference of +30 is above the first threshold, threat identification module 44 may consider the host device to be suspicious.

In other embodiments, threat identification module 44 may calculate the difference by subtracting the number of flows sourced by a host device from the number of flows sent to the host device. In these embodiments, positive differences in the exemplary graph of FIG. 8 indicate that a host device has been sent more flows than the host device has sourced. The first threshold may therefore indicate a level at which threat identification module 44 may suspect that the host device is under attack. Similarly, negative differences in the exemplary graph of FIG. 8 indicate that a host device has sourced more flows than the host device has been sent. The second threshold may therefore indicate a level at which threat identification module 44 may suspect that the host device is potentially infected.

Various embodiments of the invention have been described. For example, the invention has been explained within the context of routers. Nevertheless, this is not the exclusive embodiment. For example, the invention may be implemented in firewall devices or otherwise. Furthermore, rather than using actual numbers of flows, approximate numbers of flows may be used. These and other embodiments are within the scope of the following claims.

The invention claimed is:

1. A method comprising:
   recording, with a plurality of intermediate devices located on a set of asymmetrically routed paths within a network, a number of network flows sourced by a host device on the network and a number of network flows sent to the host device on the network;
   determining whether a difference between the number of network flows sourced by the host device and the number of network flows sent to the host device exceeds a first threshold;
   rerouting network traffic sourced by the host device to a network security device when it is determined that the difference exceeds the first threshold;
   determining whether a difference between the number of network flows sourced by the host device on the network and the number of network flows sent to the host device on the network falls beneath a second threshold; and
   rerouting network traffic sent to the host device to the network security device when it is determined that the difference falls beneath the second threshold.

2. The method of claim 1, wherein recording a number of flows comprises recording a number of network flows sourced by the host device that do not represent rejections of network connections and a number of network flows sent to the host device that do not represent rejections of network connections.

3. The method of claim 1, wherein rerouting network traffic from the host device comprises rerouting network traffic sourced by the host device to an Intrusion Detection and Prevention ("IDP") device that inspects the network traffic to identify malicious software.

4. The method of claim 1, wherein rerouting network traffic comprises sending instructions to a set of line cards, such that the line cards forward packets from the network device to the network security device.

5. The method of claim 1,
   wherein recording a number of network flows sourced by a host device on the network and a number of network flows sent to the host device on the network comprises maintaining a record of the number of flows through the network for which the host device is a source and a record of the number of flows through the network for which the host device is a destination; and
   wherein determining a difference comprises determining a difference between the record of the number of flows through the network for which the host device is a source and the record of the number of flows through the network for which the host device is a destination.

6. The method of claim 5, wherein maintaining a record comprises:
- maintaining, with each intermediate device in a set of intermediate devices in the network, records of the number of flows through the intermediate device for which the host device is a source;
- maintaining, with each intermediate device in the set of intermediate devices, records of the number of flows through the intermediate device for which the host device is a destination;
- correlating the records of the number of flows through the intermediate devices for which the host device is a source into the record of the number of flows through the network for which the host device is a source; and
- correlating the records of the number of flows through the intermediate devices for which the host device is a destination into the record of the number of flows through the network for which the host device is a destination.

7. The method of claim 6, wherein the intermediate devices are routers.

8. The method of claim 6,
- wherein maintaining, with each intermediate device in a set of intermediate devices in the network, records of the number of flows through the intermediate devices for which the host device is a source comprises maintaining, with each line card in a set of line cards in each intermediate device in the set of intermediate devices, a record of the number of flows through the line card for which the host device is a source; and
- wherein correlating the records of the number of flows through the intermediate devices that specify the host device is a source comprises correlating the records of the number of flows through the line cards for which the host device is a source.

9. The method of claim 8, wherein maintaining, with each line card in a set of line cards in each intermediate device in the set of intermediate devices, a record of the number of flows through the line card for which the host device is a source comprises:
- receiving a network packet from the network;
- determining whether the packet is a member of a new flow; and
- incrementing a number of flows through the line card for which the host device is a source if the packet is a member of a new flow and a source address field of the packet specifies the host device.

10. The method of claim 9, wherein determining whether the packet is a member of a new flow comprises:
- extracting flow information from the packet;
- determining whether a flow database contains a record that corresponds with the extracted flow information; and
- determining that the packet is a member of a new flow when it is determined that the flow database does not contain a record that corresponds with the extracted flow information.

11. The method of claim 10, further comprising adding a record that corresponds with the extracted flow information when it is determined that the flow database does not contain a record that corresponds with the extracted flow information.

12. The method of claim 10, wherein the flow database is a hash table.

13. The method of claim 10, wherein incrementing a number of flows through the line card for which the host device is a source comprises:
- determining whether a host table contains an entry for the host device;
- creating an entry in the host table for the host device if it is determined that the host table does not contain an entry for the host device; and
- incrementing a source counter in the entry in the host table for the host device.

14. The method of claim 6,
- wherein maintaining, with each intermediate device in the set of intermediate devices, records of the number of flows through the intermediate device for which the host device is a destination comprises maintaining with each line card in a set of line cards in each intermediate device in the set of intermediate devices, a record of the number of flows through the line card for which the host device is a destination; and
- wherein correlating the records of the number of flows through the intermediate devices that specify the host device is a destination comprises correlating the records of the number of flows through the line cards for which the host device is a destination.

15. The method of claim 14, wherein maintaining, with each line card in a set of line cards in each intermediate device in the set of intermediate devices, a record of the number of flows through the line card for which the host device is a destination comprises:
- receiving a network packet from the network;
- determining whether the packet is a member of a new flow; and
- incrementing the number of flows through the line card for which the host device is a destination if the packet is a member of the new flow and a destination address field of the packet specifies the host device.

16. The method of claim 1, wherein the determining whether a difference between a number of network flows sourced by the host device and the number of network flows sent to the host device exceeds a first threshold comprises determining whether a difference between an approximate number of network flows sourced by the host device and an approximate number of network flows sent to the host device exceeds a first threshold.

17. A method comprising:
- recording, with a plurality of intermediate devices located on a set of asymmetrically routed paths within a network, a number of network flows sourced by a host device on the network and a number of network flows sent to the host device on the network;
- maintaining, with each line card in a set of line cards in each of the intermediate devices, a record of the number of flows through the line card for which the host device is a source;
- maintaining, with each of the line cards in each of the intermediate devices, records of the number of flows through the intermediate device for which the host device is a destination;
- correlating the records of the number of flows through the line cards for which the host device is a source;
- summing the records of the number of flows through the line cards for which the host device is a source;
- correlating the records of the number of flows through the line cards for which the host device is a destination;
- summing the records of the number of flows through the line cards for which the host device is a destination;
- determining whether a difference between the number of network flows sourced by the host device and the number of network flows sent to the host device exceeds a first threshold; and
- rerouting network traffic from the host device when the difference exceeds the first threshold.

18. A method comprising:
recording, with a plurality of intermediate devices located on a set of asymmetrically routed paths within a network, a number of network flows sourced by a host device on the network and a number of network flows sent to the host device on the network;
maintaining, with each of the intermediate devices, a record of the number of flows through the line card for which the host device is a source;
maintaining, with each of the intermediate devices, records of the number of flows through the intermediate device for which the host device is a destination;
correlating the records of the number of flows through the intermediate devices for which the host device is a source;
summing the records of the number of flows through the intermediate devices for which the host device is a source;
correlating the records of the number of flows through the intermediate devices for which the host device is a destination;
summing the records of the number of flows through the intermediate devices for which the host device is a destination;
determining whether a difference between the number of network flows sourced by the host device and the number of network flows sent to the host device exceeds a first threshold; and
rerouting network traffic from the host device when the difference exceeds the first threshold.

19. A network device that is a member of a plurality of intermediate devices located on a set of asymmetrically routed paths within a network, the network device comprising:
a device correlation module to record a number of flows sourced by a host device on the network and the number of network flows sent to the host device on the network;
a threat identification module to determine whether a difference between a number of network flows sourced by a host device on a network via a plurality of network paths and a number of network flows sent to the host device on the network via the plurality of network paths exceeds a first threshold; and
a traffic redirection module to reroute network traffic originated by the host device to a network security device when the threat identification module determines that the difference exceeds the first threshold,
wherein the threat identification module determines whether a difference between the number of network flows sourced by the host device and the number of network flows sent to the host device falls beneath a second threshold, and
wherein the traffic redirection module reroutes network traffic destined for the host device to the network security device when the threat identification module determines that the difference falls beneath the second threshold.

20. The network device of claim 19, wherein the device correlation module records a number of flows sourced by a host device on the network and the number of network flows sent to the host device on the network by recording a number of network flows sourced by the host device that do not represent rejections of network connections and a number of network flows sent to the host device that do not represent rejections of network connections.

21. The network device of claim 19, wherein the network security device is an Intrusion Detection and Prevention ("IDP") device that deeply inspects the network traffic to identify signatures of malicious software.

22. The network device of claim 19, wherein the traffic redirection module reroutes network traffic by sending instructions to a set of line cards, such that the line cards forward packets sourced by the host device to the network security device.

23. The network device of claim 22, wherein the device correlation module correlates the records of the number of flows through the network device and the other network devices that specify the host device as a source by summing the records of the number of flows through the network device and the other network devices for which the host device is a source.

24. The network device of claim 19,
wherein the device correlation module maintains a record of the number of flows through the network for which the host device is a source and a record of the number of flows through the network for which the host device is a destination; and
wherein the threat identification module determines whether a difference between the number of network flows sourced by the host device and the number of network flows sent to the host device exceeds a first threshold by determining a difference between the record of the number of flows through the network for which the host device is a source and the record of the number of flows through the network for which the host device is a destination.

25. The network device of claim 24,
wherein the network device comprises a line card correlation module to maintain records of the number of flows through the network device for which the host device is a source, and to maintain records of the numbers of flows through the network device for which the host device is a destination; and
wherein the device correlation module maintains a record of the number of flows through the network for which the host device is a source and a record of the number of flows through the network for which the host device is a destination by correlating the records of the number of flows through the network device and other network devices that specify the host device as a source into the record of the number of flows through the network that specify the host device as a source and by correlating the records of the numbers of flows through the network device and other network devices that specify the host device as a destination into the record of the number of flows through the network that specify the host device as a destination.

26. The network device of claim 25, wherein the network device and the other network devices are routers.

27. The network device of claim 25,
wherein the network device further comprises a set of line cards, wherein each line card in the set of line cards maintains a record of the number of flows through the line card that specify the host device as a source and maintains a record of the number of flows through the line card that specify the host device as a destination;
wherein the line card correlation module maintains records of the number of flows through the line cards that specify the host device as a source by correlating the records of the number of flows through the line cards that specify the host device as a source; and
wherein the line card correlation module maintains records of the number of flows through the line cards that specify the host device as a destination by correlating the records of the number of flows through the line cards that specify the host device as a destination.

28. The network device of claim 27, wherein a line card in the set of the line cards includes a flow module to receive a network packet from the network, to determine whether the packet is a member of a new flow, and to increment the number of flows through the line card that specify the host device is a source if the packet is a member of a new flow and a source address field of the packet specifies the host device.

29. The network device of claim 28,
wherein the line card comprises a flow database to contain records that corresponds with flow information; and
wherein the flow module extracts flow information from the packet, determines whether the flow database contains a record that corresponds to the extracted flow information, and determines that the packet is a member of a new flow when the flow module determines that the flow database does not contain a record that corresponds with the extracted flow information.

30. The network device of claim 29, wherein the flow module adds a record to the flow database that corresponds with the extracted flow information when the flow module determines that the flow database does not contain a record that corresponds with the extracted flow information.

31. The network device of claim 29, wherein the flow database is a hash table.

32. The network device of claim 28,
wherein the line card comprises a host table to contain entries for host devices; and
wherein the flow module determines whether the host table contains an entry for the host device, creates an entry in the host table for the host device if the flow module determines that the host table does not contain an entry for the host device, and increments a source counter in the entry in the host table for the host device.

33. The network device of claim 27, wherein each line card in the set of line cards maintains a record of the number of flows through the line card that specify the host device as a destination by receiving a network packet from the network, determining whether the packet is a member of a new flow, and incrementing the number of flows through the line card that specify the host device as a destination if the packet is a member of a new flow and a destination address field of the packet specifies the host device.

34. The network device of claim 19, wherein the network is an enterprise network and the host device is a personal computer.

35. The network device of claim 19, wherein the threat identification module determines whether a difference between an approximation of the number of network flows sent from the host device and an approximation of the number of network flows sent to the network device exceeds the first threshold.

36. A network device that is a member of a plurality of intermediate devices located on a set of asymmetrically routed paths within a network, the network device comprising:
a plurality of line cards, wherein each line card maintains records of the number of flows through the line card for which a host device is a source and maintains records of the numbers of flows through the line card for which the host device is a destination;
a line card correlation module that correlates the records from the plurality of line cards, wherein the line card correlation module correlates the records by summing the records of the number of flows through the line cards that specify the host device as a source and by summing the records of the number of flows through the line cards that specify the host device as a destination;
a device correlation module to correlate the summed records from the line card correlation module with records from the other intermediate devices located on the asymmetrically routed paths;
a threat identification module to determine, from the correlated records from the device correlation module, whether a difference between the number of network flows sourced by the host device on the network via the set of network paths and the number of network flows sent to the host device on the network via the plurality of network paths exceeds a first threshold; and
a traffic redirection module to reroute network traffic sourced by the host device to a network security device when the threat identification module determines that the difference exceeds the first threshold.

37. A computer-readable medium comprising instructions, the instructions causing a programmable processor to:
record, with a plurality of intermediate devices located on a set of asymmetrically routed paths within a network, a number of network flows sourced by a host device on the network and a number of network flows sent to the host device on the network;
determine whether a difference between a number of network flows sent from a host device on a network via a plurality of network paths and a number of network flows sent to the host device on the network via the plurality of network paths exceeds a first threshold; and
reroute network traffic sourced by the host device to a network security device when it is determined that the difference exceeds the first threshold;
determine whether a difference between the number of network flows sourced by the host device and the number of network flows sent to the host device falls beneath a second threshold; and
reroute network traffic sent to the host device to the network security device when it is determined that the difference falls beneath the second threshold.

38. The computer-readable medium of claim 37,
wherein the instructions that cause the processor to record a number of network flows comprise instructions that cause the processor to maintain a record of the number of flows through the network for which the host device is a source and a record of the number of flows through the network for which the host device is a destination; and
wherein the instructions that cause the processor to determine a difference comprise instructions that cause the processor to determine a difference between the record of the number of flows through the network for which the host device is a source and the record of the number of flows through the network for which the host device is a destination.

* * * * *